United States Patent
Wu et al.

(10) Patent No.: US 12,367,378 B2
(45) Date of Patent: Jul. 22, 2025

(54) METHOD FOR DETECTING PRODUCT FOR DEFECTS, ELECTRONIC DEVICE, AND STORAGE MEDIUM

(71) Applicant: HON HAI PRECISION INDUSTRY CO., LTD., New Taipei (TW)

(72) Inventors: Chung-Yu Wu, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 155 days.

(21) Appl. No.: 18/126,804

(22) Filed: Mar. 27, 2023

(65) Prior Publication Data

US 2023/0384235 A1 Nov. 30, 2023

(30) Foreign Application Priority Data

May 24, 2022 (CN) .......................... 202210570241.4

(51) Int. Cl.
*G01N 21/88* (2006.01)
*G06N 3/0455* (2023.01)

(52) U.S. Cl.
CPC ....... *G01N 21/8851* (2013.01); *G06N 3/0455* (2023.01); *G01N 2021/8887* (2013.01)

(58) Field of Classification Search
CPC ... G01N 2021/8854; G01N 2021/8887; G01N 2021/889; G01N 21/84; G01N 21/88; G01N 21/8851; G06N 3/04; G06N 3/045; G06N 3/0455; G06T 2207/20081; G06T 2207/30108; G06T 2207/30124; G06T 2207/30168
See application file for complete search history.

(56) References Cited

U.S. PATENT DOCUMENTS

| | | | |
|---|---|---|---|
| 9,898,811 B2* | 2/2018 | He | G06V 20/66 |
| 10,482,590 B2* | 11/2019 | He | G06F 18/214 |
| 10,650,508 B2* | 5/2020 | Chang | G06F 18/28 |
| 11,276,162 B2* | 3/2022 | Chaton | G06V 10/82 |
| 12,100,199 B2* | 9/2024 | Hida | G06N 3/088 |
| 12,159,405 B2* | 12/2024 | Lin | G06T 7/0012 |
| 2018/0039555 A1* | 2/2018 | Salunke | G06F 11/3006 |
| 2018/0227482 A1* | 8/2018 | Holzer | G06V 20/10 |
| 2018/0268142 A1* | 9/2018 | Sethumadhavan | G06N 20/00 |
| 2019/0096056 A1* | 3/2019 | Giering | G06V 10/764 |

(Continued)

FOREIGN PATENT DOCUMENTS

| | | |
|---|---|---|
| CN | 109390245 | 2/2019 |
| CN | 111476759 | 7/2020 |

(Continued)

*Primary Examiner* — John R Lee (74) *Attorney, Agent, or Firm* — ScienBiziP, P.C.

(57) ABSTRACT

A method for detecting a product for defects implemented in an electronic device, the method obtains an image of a product to be detected, obtains a reconstructed image by inputting the image to be detected into a pre-trained autoencoder, generates a difference image from the image and the reconstructed image, obtains a number of feature absolute values by performing clustering processing on the difference image; generates a target image according to the number of feature absolute values, the difference image, and a preset value; and determines a defect detection result by detecting the target image for defects.

20 Claims, 3 Drawing Sheets

(56) References Cited

U.S. PATENT DOCUMENTS

| | | | | |
|---|---|---|---|---|
| 2019/0251349 A1* | 8/2019 | Duerksen | .................. | G07D 7/00 |
| 2020/0364842 A1* | 11/2020 | Chaton | .................... | G06N 3/04 |
| 2021/0209464 A1* | 7/2021 | Bala | .................. | G06F 18/23213 |
| 2022/0036533 A1* | 2/2022 | Xiao | .......................... | G06T 5/50 |
| 2022/0223293 A1* | 7/2022 | Steinberg-Koch | ....... | G06N 3/08 |
| 2023/0153989 A1* | 5/2023 | Ryan | ........................ | G06T 7/001 |
| | | | | 382/149 |
| 2023/0281959 A1* | 9/2023 | Hoshen | .................. | G06N 3/045 |
| | | | | 382/225 |
| 2023/0326029 A1* | 10/2023 | Yang | .................... | H04N 13/189 |
| | | | | 382/173 |
| 2023/0384235 A1* | 11/2023 | Wu | ........................ | G06N 3/088 |
| 2023/0386023 A1* | 11/2023 | Lin | ........................ | G06T 7/0012 |

FOREIGN PATENT DOCUMENTS

| | | |
|---|---|---|
| CN | 112819778 | 5/2021 |
| CN | 113344903 | 9/2021 |

* cited by examiner

METHOD FOR DETECTING PRODUCT FOR DEFECTS, ELECTRONIC DEVICE, AND STORAGE MEDIUM

FIELD

The subject matter herein generally relates to a technology of image processing, and particularly to an electronic device, a method for detecting a product for defects, and a storage medium.

BACKGROUND

In the existing method for detecting products for defects, due to the difficulty in distinguishing between background errors and real defects, the accuracy of defect detection is low.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the words and their equivalents without excluding other elements or articles. The terms "connect", "link" or the like are not limited to physical or mechanical connection, but may include electrical connections, whether direct or indirect.

Figure 1:
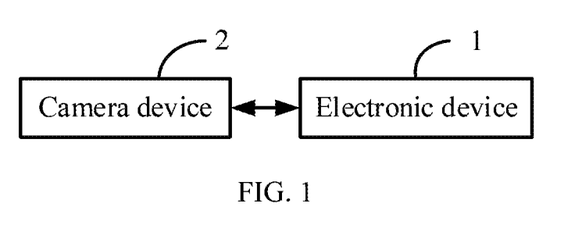
FIG. 1 is a block diagram of an embodiment of application environment of a method for detecting a product for defects according to the present disclosure.

Referring to FIG. 1, an electronic device 1 communicates with a camera device 2. The electronic device 1 may be an electronic device with a defect detection program installed, such as a personal computer, a server, etc., the server may be a single server, a server cluster, or the like.

In one embodiment, the electronic device 1 can be in a wired network environment or in a wireless network environment, the electronic device 1 communicates with the camera device 2 through the wired network or the wireless network. The wireless network can be radio, WI-FI, or cellular network. The cellular network can be a 4G network or a 5G network.

In one embodiment, the electronic device 1 may include at least one network device and/or at least one user device. The network device includes, but is not limited to, a single network server, a server group including a number of network servers, or cloud including a large number of hosts or web servers based on cloud computing.

Figure 2:
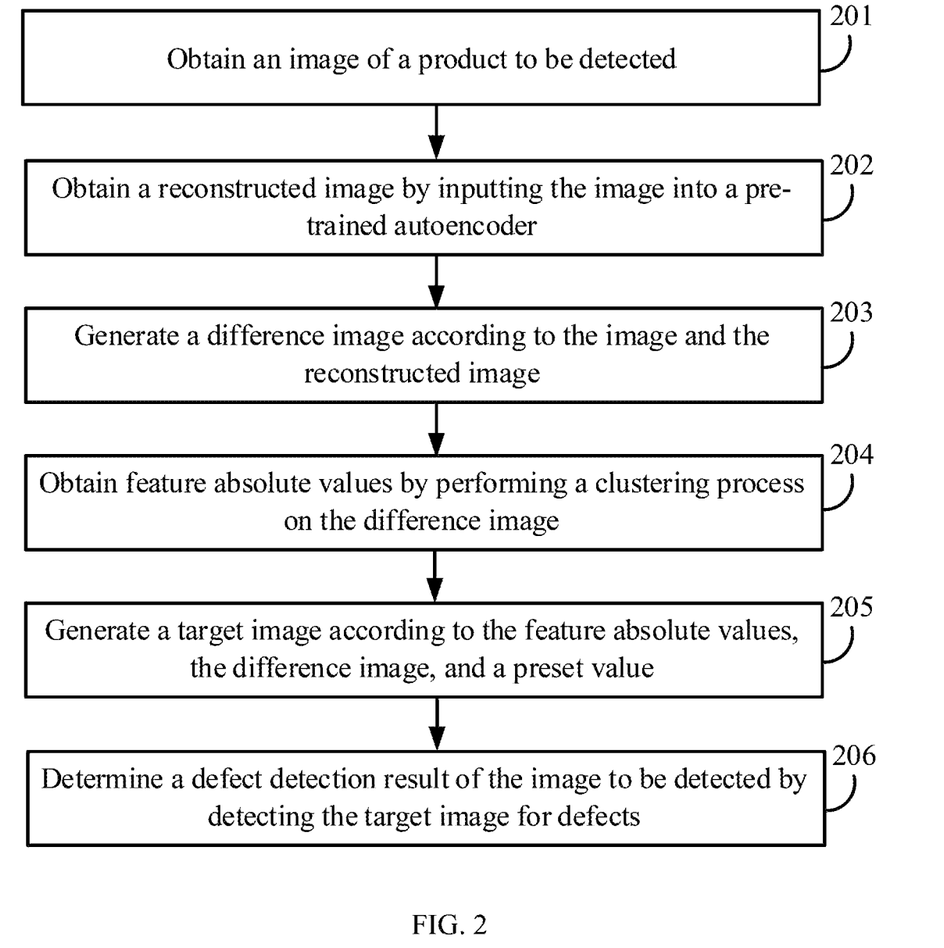
FIG. 2 illustrates a flowchart of an embodiment of a method for detecting a product for defects according to the present disclosure.

FIG. 2 illustrates a flowchart of an embodiment of a method for detecting a product for defects. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, an electronic device obtains an image to be detected.

In one embodiment, the image to be detected refers to an image of an object or a product that is required to be detected for defects.

In one embodiment, the electronic device obtains the image to be detected by: controlling the camera device to capture an image of a target object, and obtaining the image to be detected. In one embodiment, the target object can be silk fabric, water cup, toy, or other products.

At block 202, the electronic device obtains a reconstructed image by inputting the image to be detected into a pre-trained autoencoder.

In one embodiment, the pre-trained autoencoder can be an autoencoder that is generated by applying training with images of non-defective products being used.

In one embodiment, the reconstructed image can be an image generated after the image to be detected is input into the pre-trained autoencoder.

In one embodiment, before obtaining a reconstructed image by inputting the image to be detected into a pre-trained autoencoder, the method for detecting a product for defects further includes: the electronic device obtaining a number of images of non-defective products and establishing a deep learner, further, obtaining the pre-trained autoencoder by training the deep learner based on the number of images of non-defective products. In one embodiment, the electronic device establishes the deep learner based on a convolutional neural network.

In one embodiment, the number of images of non-defective products may be obtained from a first preset database, and the number of images of non-defective products can be the images showing objects without any defect.

In detail, the electronic device trains the deep learner based on the number of images of non-defective products, and obtaining the autoencoder by: calculating a loss value of the deep learner, and training the deep learner many times based on the number of images of non-defective products, until the loss value of the deep learner decreases to a minimum value, thereby obtaining the autoencoder. In one embodiment, the loss value of the deep learner can be calculated based on a cross-entropy loss function.

In one embodiment, the pre-trained autoencoder includes an encoder and a decoder, and the electronic device obtains a reconstructed image by inputting the image to be detected into the pre-trained autoencoder by: obtaining a number of feature vectors by performing encoding processing on the image to be detected, obtaining a number of latent vectors by processing each feature vector based on the encoder, and obtaining the reconstructed image by inputting the number of latent vectors to the decoder for reconstruction processing.

The encoder can be a network that extracts the features of the image to be detected, the encoder includes a convolution layer and a pooling layer. The decoder can be to a network for restoring the extracted features to the reconstruction image, the decoder includes a de-pooling layer and a de-convolution layer.

In one embodiment, the encoding processing includes obtaining a pixel value corresponding to each pixel point in the image to be detected.

In detail, the electronic device obtains a number of latent vectors by processing each feature vector based on the encoder by: obtaining a multiplication vector by multiplying each feature vector by the weight in the convolution layer, obtaining an addition vector by adding the multiplication vector with the offset in the convolution layer, and obtaining the latent vector by performing a pooling operation on the addition vector based on the pooling layer.

In one embodiment, the process of inputting the number of latent vectors to the decoder for reconstruction processing is consistent with an inverse process of performing an arithmetic process on each feature vector based on the encoder.

Since the pre-trained autoencoder is generated after the training of the number of images of non-defective products, the pre-trained autoencoder has learned the features of the number of images of non-defective products, so that the reconstructed image represents an image of a non-defective product.

At block 203, the electronic device generates a difference image according to the image to be detected and the reconstructed image.

In one embodiment, the difference image refers to an image generated by a number of absolute pixel values, the absolute pixel value is an absolute value of a difference between a pixel value of a pixel point in the image to be detected and a pixel value of a corresponding pixel point in the reconstructed image, a pixel coordinate of the pixel point in the image to be detected is the same as the corresponding pixel point in the reconstructed image.

In one embodiment, the electronic device generates a difference image according to the image to be detected and the reconstructed image by: obtaining a difference value corresponding to each pixel point by subtracting the pixel value of each pixel point in the image to be detected and the pixel value of the corresponding pixel point in the reconstructed image, obtaining the absolute pixel value by determining the absolute value of the difference value, and obtaining the difference image by arranging a number of absolute pixel values according to the corresponding position of each pixel points, such as arranging the number of absolute pixel values within a background.

Since the reconstructed image is representational of the image of the non-defective product, the pixel value of each pixel point in the image to be detected being subtracted from the pixel value of the corresponding pixel point in the reconstructed image provides the difference value, if the image to be detected is an image of a defective product, the difference value corresponding to the pixel point indicating defects will be larger, and the difference value corresponding to the background pixel point will change less, so that a preliminary distinction can be drawn between the background pixel points and pixel points indicating defects in the image to be detected.

At block 204, the electronic device obtains a number of feature absolute values by performing clustering processing on the difference image.

In one embodiment, the electronic device obtains a number of feature absolute values by performing clustering processing on the difference image by: selecting a number of absolute pixel values as cluster centers, and performing the clustering processing on the difference image according to the cluster centers. The clustering processing includes setting a category label for each cluster center, and calculating a distance between each absolute pixel value in the difference image and each cluster center, obtaining a category label corresponding to each absolute pixel value by classifying each absolute pixel value according to the distance, and calculating a loss value according to each absolute pixel value and the clustering center of the category label corresponding to each absolute pixel value. The clustering processing is repeated until the loss values converge, and the feature absolute values corresponding to each category label are obtained. If the loss values do not converge, an average value of all absolute pixel values corresponding to each category label is calculated, and each cluster center is replaced by the average value corresponding to the category label of the cluster center.

In one embodiment, the convergence of loss values means that the loss value drops to a minimum or that the loss value ceases to change, and the feature absolute value refers to the all absolute pixel values corresponding to each category label after the loss values converge. The distance may be an Euclidean distance.

In one embodiment, the category label can be the category to which the absolute pixel value belongs, and the category label includes background error and defect. It can be understood that, the cluster center includes a number of different categories. For example, when the image to be detected is the image of the defective product and two absolute pixel values are selected as the cluster centers, one cluster center refers to the absolute pixel values corresponding to the background error, and the other cluster center refers to the absolute pixel values corresponding to the defect.

In one embodiment, each cluster center is repeatedly replaced with the average value corresponding to the category label of the cluster center until the loss values converge. The category label corresponding to each absolute pixel value can be determined accurately by multiple classification of each absolute pixel value.

In detail, the loss value is calculated according to the following formula:

$$J=\Sigma_{i=1}^{M}\|x_i-\mu_{ci}\|^2 \qquad (1).$$

In the formula (1), j represents the loss value, M represents the number of absolute pixel values, $x_i$ represents the absolute value of the i-th pixel, $c_i$ represents the category label corresponding to the absolute value of the i-th pixel, and $\mu_{ci}$ represents the cluster center of the category label corresponding to the absolute value of the i-th pixel.

By replacing the cluster centers multiple times until the loss values converge, the clustering processing is performed multiple times, and the category label to which the each absolute pixel value belongs can be accurately determined.

At block 205, the electronic device generates a target image according to the feature absolute values, the difference image, and a preset value.

In one embodiment, the target image can be an image generated after adjusting the absolute values of the pixel point corresponding to the background error in the difference image to the preset value.

In one embodiment, the electronic device generates a target image according to the feature absolute values, the difference image, and a preset value by: determining the quantity of feature absolute values corresponding to each category label, determining the category label corresponding to the feature absolute values having a maximum quantity as the background error, determining the feature absolute values corresponding to the background error in the difference image to be the background absolute values, and obtaining the target image by adjusting the pixel values of the pixel points corresponding to the background absolute values in the image to be detected to the preset value.

In one embodiment, the preset value may be set according to the range of absolute pixel values of the difference image. For example, the range of absolute pixel values of the difference image may be from 0 to 255, and the preset value may be 0.

Through the above embodiment, the background error will correspond to a greater number of absolute pixel values in practical applications, thus the category label corresponding to the maximum quantity should be determined as the background error, and the absolute value of all pixel points corresponding to the background error can be quickly determined. The feature absolute value corresponding to the background error is adjusted to the preset value, which renders more obvious the difference between the pixel difference values corresponding to the background error in the difference image.

At block 206, the electronic device determines a defect detection result of the image to be detected by detecting the target image for defects.

In one embodiment, the defect detection result includes the product in the image to be detected having defects, or the product in the image to be detected not having any defects.

In one embodiment, the electronic device determines a defect detection result of the image to be detected by detecting the target image for defects by: determining the feature absolute values in the target image other than the preset value as the target absolute values, generating a connection area according to a number of adjacent target absolute values, and determining a sum of all target absolute values in the connection area, if the sum is greater than a preset threshold, determining that the product in the image to be detected has defects, if the sum of the absolute values is less than or equal to the preset threshold, determining that the product in the image to be detected has no defect. The preset threshold may be preset according to actual requirement.

Since the target image may includes the absolute pixel values corresponding to the background error, when the product in the image to be detected has defect, the absolute pixel values corresponding to pixels indicating possibly defects can be further filtered out by determining the connection area according to a number adjacent target absolute values, so as to improve the accuracy of defect detection.

Since the difference image contains background errors, the absolute pixel values corresponding to the background error in the difference image can be accurately determined according to the classification result of the absolute pixel values. The absolute pixel values corresponding to the background error being adjusted to the preset value filters out the absolute pixel values corresponding to the background errors, the influence of the background error can be eliminated, thereby improving the accuracy of defect detection.

Figure 3:
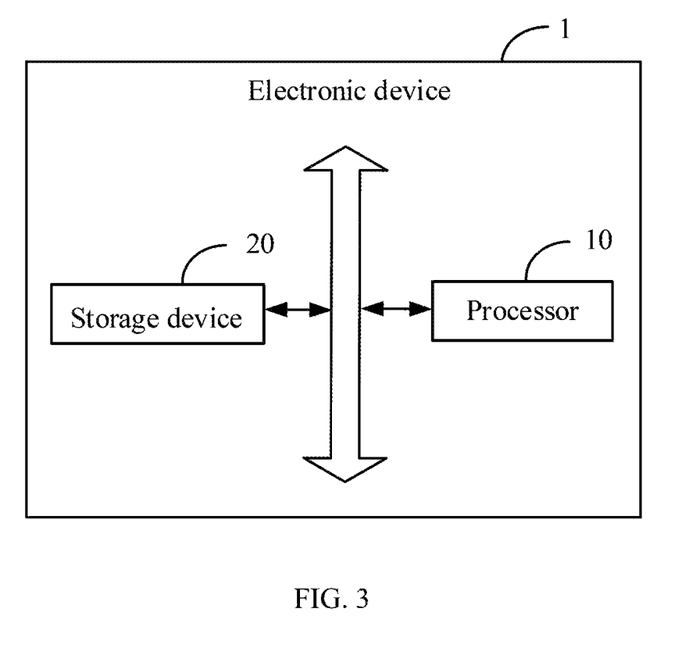
FIG. 3 is a block diagram of an embodiment of an electronic device according to the present disclosure.

FIG. 3 illustrates the electronic device 1 in one embodiment. The electronic device 1 includes, but is not limited to, a processor 10, a storage device 20, and a computer program. FIG. 3 illustrates only one example of the electronic device 1. Other examples can include more or fewer components than as illustrated or have a different configuration of the various components in other embodiments.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

The storage device 20 stores instructions, the processor 10 executes the computer program stored in the storage device 20 for implementing the method for detecting a product for defects provided in the embodiments of the present disclosure. The computer program can be defect detection program and include instructions.

Upon execution of the instructions stores in the storage device 20, the processor 10 is configured to:
obtain an image to be detected;
obtain a reconstructed image by inputting the image to be detected into a pre-trained autoencoder;
generate a difference image according to the image to be detected and the reconstructed image;
obtain feature absolute values by performing clustering processing on the difference image;
generate a target image according to the feature absolute values, the difference image, and a preset value; and
obtain a defect detection result of the image to be detected by detecting the target image for defects.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   obtain an image of a product to be detected;
   obtain a reconstructed image by inputting the image into a pre-trained autoencoder;
   generate a difference image according to the image and the reconstructed image;
   obtain a plurality of feature absolute values by performing clustering processing on the difference image;
   generate a target image according to the plurality of feature absolute values, the difference image, and a preset value, the present value being a preset pixel value that is set according to a range of a plurality of absolute pixel values of the difference image; and
   determine a defect detection result of the image by detecting the target image for defects.

2. The electronic device according to claim 1, wherein the at least one processor is further caused to:
   obtain a plurality of images of non-defective products;
   establish a deep learner; and
   obtain the pre-trained autoencoder by training the deep learner based on the plurality of images of the non-defective products.

3. The electronic device according to claim 2, wherein the pre-trained autoencoder comprises an encoder and a decoder, the at least one processor is further caused to:
   obtain a plurality of feature vectors by performing encoding process on the image;
   obtain a plurality of latent vectors by processing each of the plurality of feature vectors based on the encoder; and
   obtain the reconstructed image by inputting the plurality of latent vectors to the decoder for reconstruction processing.

4. The electronic device according to claim 1, wherein the at least one processor is further caused to:
   obtain a difference value corresponding to each pixel point by subtracting a pixel value of each pixel point in the image and a pixel value of a corresponding pixel point in the reconstructed image;
   obtain a plurality of absolute pixel values by determining an absolute value of each difference value; and
   obtain the difference image by arranging the plurality of absolute pixel values according to positions of the corresponding pixel points.

5. The electronic device according to claim 4, wherein the at least one processor is further caused to:
   select the plurality of absolute pixel values as a plurality of cluster centers;
   perform clustering processing on the difference image based on the clustering centers, the clustering processing comprising: setting a category label for each of the plurality of cluster center, and calculating a distance between each absolute pixel value in the difference image and each cluster center, obtaining the category label corresponding to each absolute pixel value by classifying each absolute pixel value according to the distance, and calculating a loss value according to the cluster center of the category label corresponding to each absolute pixel value;
   repeat the clustering processing until the loss value converges, and obtain the plurality of feature absolute values corresponding to each category label; and
   in response that the loss value does not converge, calculate an average value of all absolute pixel values corresponding to each category label, and replace each cluster center with the average value corresponding to the category label of the cluster center.

6. The electronic device according to claim 5, wherein the loss value is calculated according to the following formula:

$$J = \sum_{i=1}^{M} \left\| x_i - \mu_{c_i} \right\|^2;$$

in which, j represents to the loss value, M represents the quantity of the absolute pixel values, $x_i$ represents the absolute value of an i-th pixel, $c_i$ represents the category label corresponding to the absolute value of the i-th pixel, $\mu_{ci}$ represents a cluster center of the category label corresponding to the absolute value of the i-th pixel.

7. The electronic device according to claim 5, wherein the at least one processor is further caused to:
   determine the quantity of feature absolute values corresponding to each category label;
   determine the category label corresponding to the feature absolute values having a maximum quantity as background error;
   determine the plurality of feature absolute values corresponding to the background error in the difference image as a plurality of background absolute values; and
   obtain the target image by adjusting the pixel values of the pixel points corresponding to the plurality of background absolute values in the image to the preset value.

8. The electronic device according to claim 1, wherein the at least one processor is further caused to:
   determine the plurality of feature absolute values in the target image other than the preset value as a plurality of target absolute values;
   generate a connection area according to a plurality of adjacent target absolute values;
   determine a sum of all target absolute values in the connection area;
   in response that the sum is greater than a preset threshold, determine that the product in the image has defects; and
   in response that the sum is less than or equal to the preset threshold, determine that the product in the image has no defect.

9. A method for detecting a product for defects implemented in an electronic device comprising:
   obtaining an image of a product to be detected;
   obtaining a reconstructed image by inputting the image into a pre-trained autoencoder;
   generating a difference image according to the image and the reconstructed image;
   obtaining a plurality of feature absolute values by performing clustering processing on the difference image;
   generating a target image according to the plurality of feature absolute values, the difference image, and a preset value, the present value being a preset pixel value that is set according to a range of a plurality of absolute pixel values of the difference image; and
   determining a defect detection result of the image by detecting the target image for defects.

10. The method according to claim 9, further comprising:
    obtaining a plurality of images of non-defective products;
    establishing a deep learner; and obtaining the pre-trained autoencoder by training the deep learner based on the plurality of images of the non-defective products.

11. The method according to claim 10, wherein the pre-trained autoencoder comprises an encoder and a decoder, obtaining a reconstructed image by inputting the image into a pre-trained autoencoder comprises:
obtaining a plurality of feature vectors by performing encoding process on the image;
obtaining a plurality of latent vectors by processing each of the plurality of feature vectors based on the encoder; and
obtaining the reconstructed image by inputting the plurality of latent vectors to the decoder for reconstruction processing.

12. The method according to claim 9, wherein generating a difference image according to the image and the reconstructed image comprises:
obtaining a difference value corresponding to each pixel point by subtracting a pixel value of each pixel point in the image and a pixel value of a corresponding pixel point in the reconstructed image;
obtaining a plurality of absolute pixel values by determining an absolute value of each difference value; and
obtaining the difference image by arranging the plurality of absolute pixel values according to positions of the corresponding pixel points.

13. The method according to claim 12, wherein obtaining a plurality of feature absolute values by performing clustering processing on the difference image comprises:
selecting the plurality of absolute pixel values as a plurality of cluster centers;
performing clustering processing on the difference image based on the clustering centers, the clustering processing comprising: setting a category label for each of the plurality of cluster center, and calculating a distance between each absolute pixel value in the difference image and each cluster center, obtaining the category label corresponding to each absolute pixel value by classifying each absolute pixel value according to the distance, and calculating a loss value according to the cluster center of the category label corresponding to each absolute pixel value;
repeating the clustering processing until the loss value converges, and obtaining the plurality of feature absolute values corresponding to each category label; and
in response that the loss value does not converge, calculating an average value of all absolute pixel values corresponding to each category label, and replacing each cluster center with the average value corresponding to the category label of the cluster center.

14. The method according to claim 13, wherein the loss value is calculated according to the following formula:

$$J = \sum_{i=1}^{M} \|x_i - \mu_{c_i}\|^2;$$

in which, j represents to the loss value, M represents the quantity of absolute pixel values, $x_i$ represents the absolute value of an i-th pixel, $c_i$ represents the category label corresponding to the absolute value of the i-th pixel, $\mu_{c_i}$ represents a cluster center of the category label corresponding to the absolute value of the i-th pixel.

15. The method according to claim 13, wherein generating a target image according to the plurality of feature absolute values, the difference image, and a preset value comprises:
determining the plurality of feature absolute values corresponding to each category label;
determining the category label corresponding to the feature absolute values having a maximum quantity as background error;
determining the plurality of feature absolute values corresponding to the background error in the difference image as a plurality of background absolute values; and
obtaining the target image by adjusting the pixel values of the pixel points corresponding to the plurality of background absolute values in the image to the preset value.

16. The method according to claim 9, wherein determining a defect detection result of the image by performing a defect detection on the target image comprises:
determining the plurality of feature absolute values in the target image other than the preset value as a plurality of target absolute values;
generating a connection area according to a plurality of adjacent target absolute values;
determining a sum of all target absolute values in the connection area;
in response that the sum is greater than a preset threshold, determining that the product in the image has defects and in response that the sum is less than or equal to the preset threshold, determining that the product in the image has no defect.

17. A non-transitory computer-readable storage medium having instructions stored thereon, when the instructions are executed by a processor of an electronic device, the processor is configured to perform a method for detecting a product for defects, wherein the method comprises:
obtaining an image of a product to be detected;
obtaining a reconstructed image by inputting the image into a pre-trained autoencoder;
generating a difference image according to the image and the reconstructed image;
obtaining a plurality of feature absolute values by performing clustering processing on the difference image;
generating a target image according to the plurality of feature absolute values, the difference image, and a preset value, the present value being a preset pixel value that is set according to a range of a plurality of absolute pixel values of the difference image; and
determining a defect detection result of the image by detecting the target image for defects.

18. The non-transitory computer-readable storage medium according to claim 17, wherein the method further comprises:
obtaining a plurality of images of non-defective products;
establishing a deep learner; and
obtaining the pre-trained autoencoder by training the deep learner based on the plurality of images of the non-defective products.

19. The non-transitory computer-readable storage medium according to claim 18, wherein the pre-trained autoencoder comprises an encoder and a decoder, obtaining a reconstructed image by inputting the image into a pre-trained autoencoder comprises:
obtaining a plurality of feature vectors by performing encoding process on the image;
obtaining a plurality of latent vectors by processing each of the plurality of feature vectors based on the encoder; and obtaining the reconstructed image by inputting the plurality of latent vectors to the decoder for reconstruction processing.

20. The non-transitory computer-readable storage medium according to claim 17, wherein generating a difference image according to the image and the reconstructed image comprises:
obtaining a difference value corresponding to each pixel point by subtracting a pixel value of each pixel point in the image and a pixel value of a corresponding pixel point in the reconstructed image;
obtaining a plurality of absolute pixel values by determining an absolute value of each difference value; and
obtaining the difference image by arranging the plurality of absolute pixel values according to positions of the corresponding pixel points.

* * * * *